United States Patent [19]

Hobson

[11] Patent Number: 4,871,597
[45] Date of Patent: Oct. 3, 1989

[54] LIGHT-WEIGHT MULTI-LAYER INSULATING ENCLOSURE

[76] Inventor: Michael A. Hobson, 80 Varick St., #4D, New York, N.Y. 10013

[21] Appl. No.: 153,065

[22] Filed: Feb. 8, 1988

[51] Int. Cl.$^4$ .............................................. B32B 27/00
[52] U.S. Cl. .................................. 428/36.1; 428/36.2; 428/36.5; 428/36.6; 428/285; 428/286; 428/287; 428/920; 215/12.1; 215/12.2; 215/13.1; 220/903
[58] Field of Search ............... 428/285, 286, 287, 920, 428/247, 255, 35, 36, 101, 36.1, 36.2, 36.5, 36.6; 215/12.1, 12.2, 13.1, 11.6; 220/903

[56] References Cited

U.S. PATENT DOCUMENTS

| | | | |
|---|---|---|---|
| 2,376,194 | 4/1942 | Samuels | 215/12.1 |
| 2,731,182 | 9/1953 | Higgins | 215/12.1 |
| 4,197,890 | 4/1980 | Simko | 150/2.2 |
| 4,282,279 | 8/1981 | Strickland | 428/101 |
| 4,401,245 | 8/1983 | Zills | 224/148 |
| 4,462,444 | 7/1984 | Larson | 150/52 R |
| 4,569,874 | 2/1986 | Kuznetz | 428/109 |
| 4,608,298 | 8/1986 | Klaff | 428/246 |
| 4,626,455 | 12/1986 | Karabedian | 428/35 |

FOREIGN PATENT DOCUMENTS

| | | | |
|---|---|---|---|
| 2439239 | 2/1976 | Fed. Rep. of Germany | 428/920 |
| 159339 | 9/1984 | Japan | 428/920 |

*Primary Examiner*—Ellis P. Robinson
*Assistant Examiner*—Archene A. Turner
*Attorney, Agent, or Firm*—Haverstock, Garrett & Roberts

[57] ABSTRACT

A light-weight multi-layer insulating enclosure comprised of four different layers of materials to provide maximum insulation for containers ranging from relatively rigid to relatively flexible construction. The improved insulating qualities of the present invention are achieved through the use of an inner-most fabric liner layer, a second inner-most insulating layer which includes a polymeric foam, a third inner-most metalized polymer film reflective layer, and an outer-most fabric mesh layer. The enclosure is light-weight, collapsible and removable.

6 Claims, 1 Drawing Sheet

U.S. Patent    Oct. 3, 1989    4,871,597
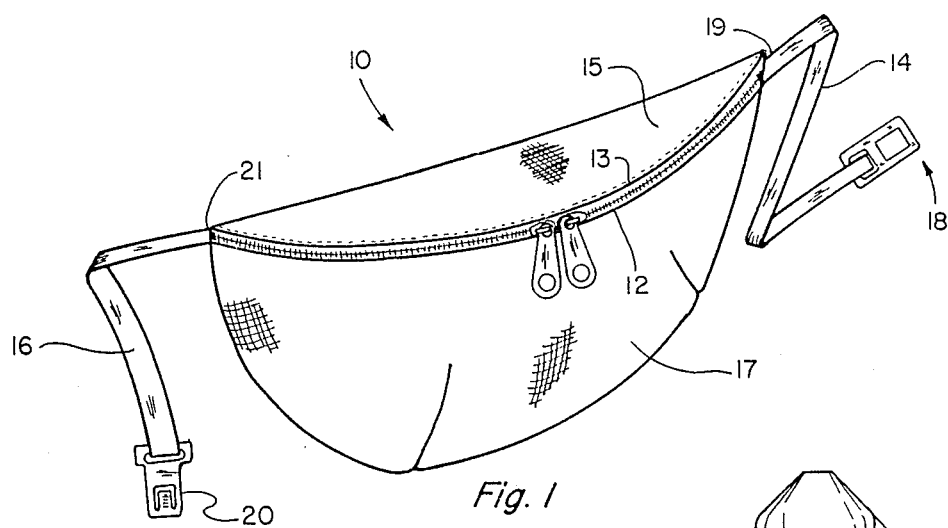
Fig. 1
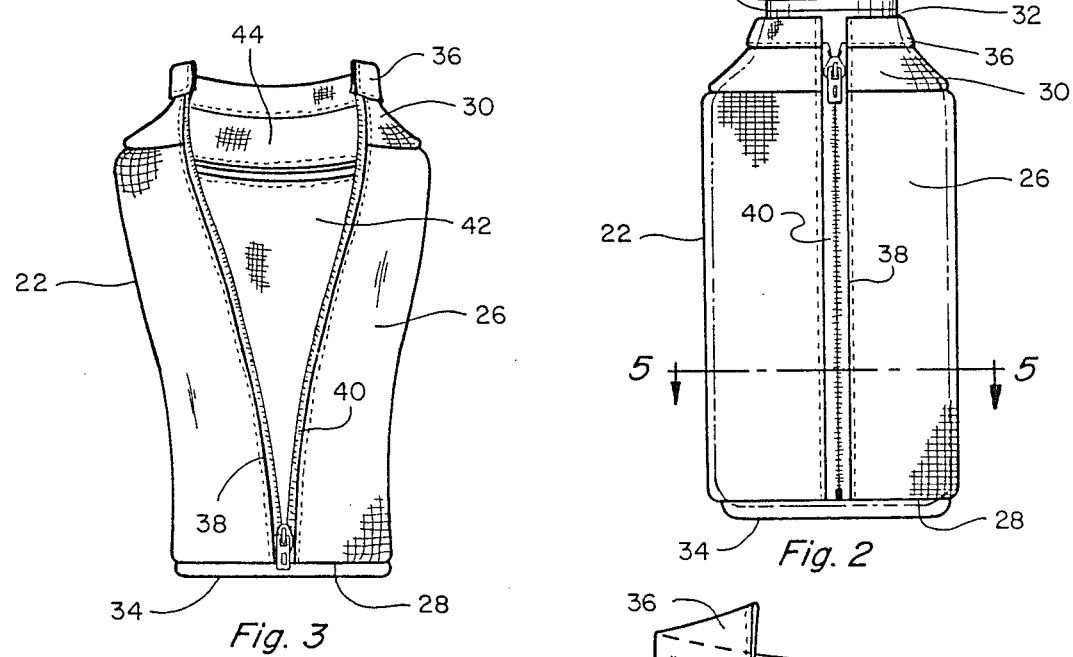
Fig. 3
Fig. 2
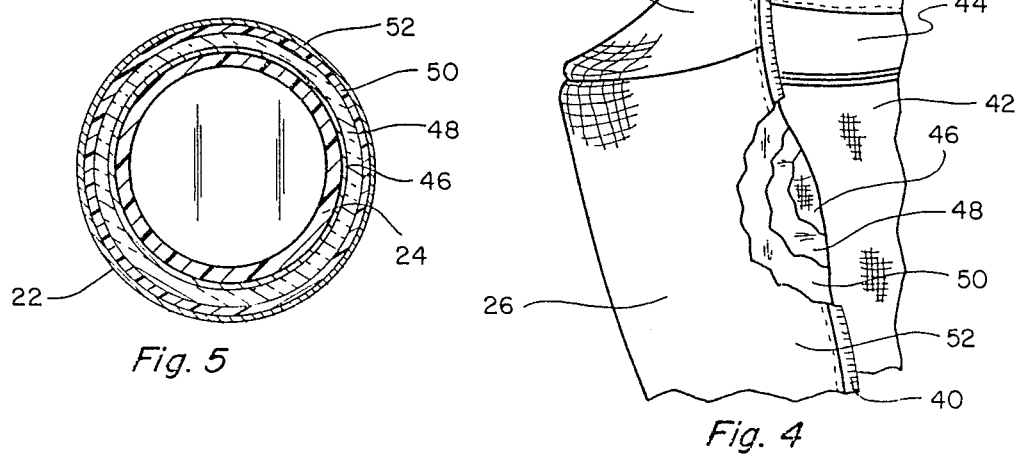
Fig. 5
Fig. 4

LIGHT-WEIGHT MULTI-LAYER INSULATING ENCLOSURE

BACKGROUND OF THE INVENTION

The present invention relates to an insulating enclosure for a container and more particularly to a light-weight multi-layer insulating enclosure for a container wherein the container may be any shape and construction and contains a substance to be maintained at a temperature other than the ambient temperature of the environment.

Insulating enclosures for containers are disclosed in the prior art. Strickland U.S. Pat. No. 4,282,279 shows an enclosure used to insulate containers. The formable, insulating enclosure has a pliable elongated substantially rectangular shaped cover member which is adapted to be positioned and formed around the exterior outer surface of the container. The outer protective layers of the Strickland device are formed of a nylon material which is selected because it is impervious to fluids and makes the interior thereof essentially water tight. The insulating layer is adapted to be formed around the periphery of the container such that one of the protective layers of the cover member is positioned between the insulating layer and the exterior outer surface of the container.

Larson U.S. Pat. No. 4,462,444 shows an insulating jacket for a beverage container. The Larson device includes an outer cover and an inner resilient insulating material which is lined with preferably a cloth material. A stitching at each of the top and bottom ends holds the various materials in place relative to one another. Two other types of covers for containers are disclosed in U.S. Pat. No. 4,626,455 and U.S. Pat. No. 4,401,245.

The present invention differs from the known prior art devices in important respects. Specifically, the present invention is designed to provide maximum insulation while still providing the feature of being light-weight. Maximum insulation is achieved in the present invention through the use of four layers of differing materials wherein each layer serves a specific purpose.

SUMMARY OF THE INVENTION

The present invention is a light-weight multi-layer enclosure which insulates containers placed therein and is especially well suited for use by bike riders, cross country skiers, hikers, astronauts and people in situations where light-weight and maximum insulation are primary objectives. Containers placed in the subject light-weight multi-layer insulating enclosure may range from relatively rigid to relatively flexible constructions depending upon the contents stored therein and the intended use. For example, a cross country bike rider might use the invention to insulate a relatively rigid container for storing fluids such as water and juices. On the other hand, astronauts may wish to store in the insulated container food products such as meat pastes which could be packaged in thin flexible containers and which may be squeezed to dispense the pastes. The light-weight multi-layer insulating enclosure of this invention is very versatile and can be adapted to enclose any size, shape and number of containers. It can have an opening for easy access to the container or be completely sealed with an engagement means.

The light-weight multi-layer insulating enclosure includes four layers of differing materials, wherein each layer serves a specific purpose. More specifically, the inner-most fabric liner layer includes a fabric which may be made from various known materials such as cotton, nylon or polyester.

The second inner-most layer includes a polymeric foam insulating material.

The third inner-most layer is a polymer film reflective layer which includes a thin polymer film coated with a reflective metallic material.

The fourth and outer-most layer includes a mesh fabric which may be made from various known materials such as cotton, nylon or polyester.

Each layer of material provides a specific result in combining light-weight with maximum insulating properties. More particularly, the inner-most fabric liner layer serves as a durable lining. The second inner-most layer which includes a polymeric foam insulating material provides a barrier against convective heat transfer. The third inner-most layer of metallized polymer film is a radiant barrier which prevents conductive heat transfer. The outer-most layer of mesh fabric adds strength to the structure.

The four layers of differing materials maybe laminated, stitched or joined together with an adhesive to provide a flexible and collapsible enclosure. The layers formed into the enclosure are adapted to be positioned around the exterior surface of a container. Thus, because of the light-weight multi-layer construction disclosed herein, the present enclosure is ideal in situations where light-weight and maximum insulation are important.

It is therefore an object of the present invention to provide a light-weight multi-layer enclosure with improved insulating capabilities.

Another object is to provide an insulating enclosure that is removable.

Another object is to provide an insulating enclosure that is collapsible for easy storage.

Another object is to provide an insulating enclosure for containers ranging from relatively flexible to relatively rigid construction.

These and other objects and advantages of the present invention will become apparent after considering the following detailed specification which covers the preferred embodiment of the subject enclosure in conjunction with the accompanying drawings.

BRIEF DESCRIPTION OF DRAWINGS

FIG. 1 is a front elevational view of one embodiment of the light-weight multi-layer insulating enclosure of the present invention;

FIG. 2 is a front elevational view of another embodiment of the light-weight multi-layer insulating enclosure with a container inside;

FIG. 3 is a front elevational view of the light-weight multi-layer insulating enclosure with engagement means disengaged;

FIG. 4 is a partial cut-away view corresponding to FIG. 3 with break aways to illustrate the multi-layer construction;

FIG. 5 i a cross-sectional view taken along line 5—5 of FIG. 2.

DESCRIPTION OF THE PREFERRED EMBODIMENT

With reference to the drawings, like reference numerals designate identical or corresponding parts throughout the several views. With reference to FIG. 1, enclosure 10 forms an insulating jacket completely surrounding a container (not shown). Enclosure 10 is formed in a crescent-shaped wedge although any geometrical shape may be used. Body member 17 forms the lower portion of enclosure 10. Top flap member 15 forms the upper portion of enclosure 10 and is attached to body member 17. Between body member 17 and top flap member 15, slit 13 extends horizontally across the front half of enclosure 10. Engagement means 12, which in the preferred embodiment is a double zipper, is fixed in slit 13 to enable opening and closing thereof. Snaps, buttons or Velcro (a trademark of Velcro USA, Inc.) strips and other closing devices may be used for engagement means 12.

Optional straps 14 and 16 are attached on opposite sides of enclosure 10 at each end of engagement means 12. Straps 14 and 16 may be made from any conventional strap material and are used to attach enclosure 10 e.g. around the user's waist. Opposite the attached strap ends 19 and 21 of straps 14 and 16, respectively, are buckle means 18 and 20. Buckle means 18 and 20 are designed to interlock with one another to secure enclosure 10 and may be disengaged for removing enclosure 10. Buckle means 18 and 20 can be made in a variety of different ways as will be obvious to persons skilled in the art and can be made from conventional materials such as plastics and metals.

Referring to FIG 2 another embodiment of the light-weight multi-layer insulating enclosure is shown. The enclosure 22 for a container 24 forms an insulative jacket around container 24. Enclosure 22 has a closed lower end 34 and open upper end 32 through which the container 24 extends upwardly for easy access to the contents. The body member 26 of enclosure 22 forms a cylindrical configuration around the periphery of container 24. The lower end of body member 26 is fixed to the periphery of base member 28 and the upper end of body member 26 is fixed to lower end of neck member 30. Neck member 30 slants upwardly and inwardly fitting firmly around the neck portion of container 24 which snuggly secures container 24 within enclosure 22. Fixed to the upper end of neck member 30 is an optional fabric band 36 which adds strength and durability to enclosure 22. Of course, the light-weight multi-layer insulating enclosure of the present invention can be constructed in a wide variety of ways differing from either of the preferred embodiments 10 or 22 disclosed herein to surround a container of virtually any shape.

With reference to FIG. 3, a longitutinal slit 38 in enclosure 22 extends downwardly from open end 32, through fabric band 36, neck member 30, and body member 26. An engagement means 40, which in the preferred embodiment is a zipper, is fixed in the longitudinal slit to enable opening or closing thereof (see FIG. 3). Other engagement means such as snaps, buttons or Velcro strips are also possible in different variations of enclosure 22.

The base member 28, body member 26, and neck member 30 of enclosure 22, like body member 17 and top flap member 15 of enclosure 10, are all comprised of at least four layers of materials wherein each serves a specific function.

Referring to FIG. 4 and FIG. 5, FIG. 4 shows all four layers of the enclosure 22 in a partial cutaway view and FIG. 5 shows all four layers in cross section. The inner-most fabric liner layer 46 serves as a lining for the inside of enclosure 22. Layer 46 also forms the inner interior surfaces 42 and 44 of body member 26 and neck member 30 respectively. In the preferred embodiment, the inner-most fabric liner layer 46 includes a fabric of a particular weave wherein the material can be cotton, nylon, polyester, or other known fabric materials. A preferred material is trico which is generally made of 100% 40 denier nylon.

The second inner-most insulating layer 48 serves as an insulator from convective heat transfer and includes a polymeric foam insulating material. One such insulating material particularly useful for this purpose is a polyurethane membrane with a layer of polyurethane foam adhesively engaged thereto with a plurality of fibers secured to the membrane extending through and beyond the foam to form a napped surface marketed under the trademark Delsolite by the Nylco Corporation (a subsidiary of Worthen Industries, Inc.) and is disclosed in U.S. Pat. No. 4,515,844. Other useful polymeric foam materials include polyolefin foams and styrene-butadiene foams.

The third inner-most polymer film reflective layer 50 includes a thin polymer film coated with a reflective metallic material which serves as a radiant barrier to prevent conductive heat transfer. The polymer film may be a polyolefin, a polyester, or a polyamide. The reflective metallic material deposited on the polymer film may be any metal that can be deposited on a plastic sheet. Aluminum, nickel and silver are examples of such metals.

The fourth and outer-most fabric mesh layer 52 is a fabric mesh material which may be polyester, nylon, cotton or other known fabric mesh materials which adds strength to the structure while not obscuring the reflective qualities of the third inner-most polymer film reflective layer 50.

Combining these four different layers of materials, insulating properties are greatly increased while maintaining light-weight as compared to materials currently being used in such enclosures.

To illustrate the improved insulating capabilities of the present invention, two series of tests were performed. In the first series of tests, three identical bicycle water bottles were filled with water and chilled to 32° F. (0° C.). The first of the three bottles, which received no insulation, was labeled as the "control bottle". The second water bottle was surrounded with Delsolite, and the third bottle was surrounded with the multi-layer insulating enclosure of the present invention. All three bottles were then subjected to heat of 239° F. (115° C.) from infra red heat lamps. The results were taken at ten minute intervals with laboratory grade thermometers. The results recorded in Table 1 are the averages from the results of ten identical experiments to ensure statistical accuracy of the measurements. Also, the contol bottle was only tested for sixty minutes, as the results indicate, since the water inside the bottle would be unsuitable to drink after that time period. The results are recorded in TABLE 1 below:

TABLE 1

| | Infra Red Heat Lamp Test | | | | | |
|---|---|---|---|---|---|---|
| | Control Bottle | | Delsolite | | Multi-Layer Insulation | |
| Minutes | °C. | °F. | °C. | °F. | °C. | °F. |
| 0 | 0 | 32 | 0 | 32 | 0 | 32 |
| 10 | 10 | 50 | 5 | 41 | 5 | 41 |
| 20 | 17 | 63 | 7 | 45 | 7 | 45 |
| 30 | 25 | 77 | 10 | 49 | 8 | 46 |
| 40 | 31 | 88 | 13 | 55 | 10 | 49 |
| 50 | 38 | 100 | 16 | 61 | 11 | 52 |

TABLE 1-continued

| | Infra Red Heat Lamp Test | | | | | |
|---|---|---|---|---|---|---|
| | Control Bottle | | Delsolite | | Multi-Layer Insulation | |
| Minutes | °C. | °F. | °C. | °F. | °C. | °F. |
| 60 | 42 | 108 | 17 | 63 | 13 | 55 |
| 70 | | | 18 | 65 | 15 | 58 |
| 80 | | | 21 | 70 | 16 | 60 |
| 90 | | | 22 | 71 | 17 | 62 |
| 100 | | | 24 | 75 | 18 | 64 |
| 110 | | | 25 | 76 | 19 | 66 |
| 120 | | | 25 | 77 | 21 | 69 |
| 130 | | | 26 | 79 | 21 | 70 |
| 140 | | | 30 | 86 | 23 | 73 |

The second series of tests was identical to the first series of heat lamp tests except instead of using infra red heat lamps, the tests were conducted outdoors under sunny conditions with the outside temperature being 81° F. (27° C.). Water temperatures within the three containers were measured at 39° F. (4° C.) at the start of the tests. The results of the ten test series were measured in ten minute intervals and the averages recorded in TABLE 2 below:

TABLE 2

| | Outdoor Direct Sun Test | | | | | |
|---|---|---|---|---|---|---|
| | Control Bottle | | Delsolite | | Multi-Layer Insulation | |
| Minutes | °C. | °F. | °C. | °F. | °C. | °F. |
| 0 | 4 | 39 | 4 | 39 | 3 | 39 |
| 10 | 16 | 61 | 5 | 41 | 5 | 41 |
| 20 | 16 | 61 | 6 | 43 | 6 | 42 |
| 30 | 18 | 64 | 12 | 54 | 10 | 50 |
| 40 | 22 | 72 | 13 | 55 | 12 | 53 |
| 50 | 25 | 77 | 15 | 59 | 12 | 54 |
| 60 | 26 | 79 | 16 | 61 | 13 | 55 |

Clearly, the light-weight multi-layer insulating enclosure of the present invention proved to be unexpectedly superior in both series of tests. In the series of infra red heat lamp tests the light-weight multi-layer insulating cover of the present invention proved to be 15% more effective than the Delsolite cover. Also, the light-weight multi-layer insulating enclosure of the present invention was 32% more effective than using no insulation at all which is evidenced by the results obtained from the control bottle. In the series of outdoor direct sun tests, the light-weight multi-layer insulating enclosure of the present invention proved to be 8% more effective than the Delsolite cover and 29% more effective than the control bottle having no insulation at all. From these two series of tests, the unexpected properties of the light-weight multi-layer insulating enclosure of the present invention composed of four differing layers of materials proved to be far superior to the insulators currently being used in such enclosures.

Thus there has been shown and described novel improvements in insulating enclosures using the subject light-weight multi-layer enclosure which fulfills all of the objects and advantages sought therefore. Many changes, modifications, variations, and other uses will however suggest themselves to those skilled in the art after considering the specification and the accompanying drawings. A few contemplated variations being back packs, bike packs, or lunch packs. All such changes, modifications, variations and other uses and applications which do not depart from the spirit and scope of the invention are deemed to be covered by the invention which is limited only by the claims which follow.

What is claimed is:

1. A light-weight multi-layered insulating enclosure having an opening for receiving or removing a container, wherein said enclosure completely surrounds a container and is formed of four differing layers of materials laminated, stitched or adhesively joined
    (a) an inner-most knitted fabric liner layer,
    (b) a second inner most insulating layer next to said inner-most layer which includes polymer foam,
    (c) a third inner most polymer film reflective layer next to said inner most layer constructed of a polymer film coated with a reflective metallic material on the outer surface thereof,
    (d) an outermost knitted fabric mesh layer next to said third inner-most layer wherein said third inner-most polymer film reflective layer is constructed of a polymer film having an outer surface coated with a reflective metallic material visible through said outer-most fabric mesh layer.

2. The insulating enclosure of claim 1 wherein said inner-most knitted fabric liner layer includes a fabric comprised of cotton, nylon or polyester.

3. The insulating enclosure of claim 1 wherein said second inner-most insulating layer includes a polyurethane foam insulating material.

4. The insulating enclosure of claim 1 wherein said outer-most knitted fabric mesh layer includes a mesh fabric comprised of cotton, nylon or polyester.

5. The insulating enclosure of claim 1 wherein said opening includes an engagement means for closing.

6. The insulating enclosure of claim 1 wherein said enclosure is collapsible for easy storage.

* * * * *

UNITED STATES PATENT AND TRADEMARK OFFICE
CERTIFICATE OF CORRECTION

PATENT NO. : 4,871,597
DATED : October 3, 1989
INVENTOR(S) : Michael A. Hobson

It is certified that error appears in the above-identified patent and that said Letters Patent is hereby corrected as shown below:

column 2, line 22, "maybe" should be --may be--.

column 2, line 61, "i" should be --is--.

column 6, line 24, after "joined" insert --together--:

Signed and Sealed this

Twentieth Day of November, 1990

Attest:

HARRY F. MANBECK, JR.

*Attesting Officer*          *Commissioner of Patents and Trademarks*